United States Patent
Liu et al.

(10) Patent No.: US 11,343,794 B2
(45) Date of Patent: May 24, 2022

(54) TECHNIQUES FOR BROADCASTING PAGING MESSAGES IN WIRELESS COMMUNICATIONS

(71) Applicant: QUALCOMM Incorporated, San Diego, CA (US)

(72) Inventors: Huichun Liu, Beijing (CN); Xipeng Zhu, Beijing (CN); Peng Cheng, Beijing (CN); Ruiming Zheng, Beijing (CN); Gavin Bernard Horn, San Diego, CA (US); Luis F. B. Lopes, Swindon (GB)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/465,072

(22) PCT Filed: Jan. 9, 2018

(86) PCT No.: PCT/CN2018/071890
§ 371 (c)(1),
(2) Date: May 29, 2019

(87) PCT Pub. No.: WO2018/130136
PCT Pub. Date: Jul. 19, 2018

(65) Prior Publication Data
US 2019/0387496 A1    Dec. 19, 2019

(30) Foreign Application Priority Data
Jan. 11, 2017 (WO) ................ PCT/CN2017/070859

(51) Int. Cl.
*H04W 68/02* (2009.01)
*H04W 4/06* (2009.01)

(52) U.S. Cl.
CPC ............. *H04W 68/02* (2013.01); *H04W 4/06* (2013.01)

(58) Field of Classification Search
CPC ........................... H04W 68/02; H04W 68/005
See application file for complete search history.

(56) References Cited

U.S. PATENT DOCUMENTS 4,802,209 A * 1/1989 Hasegawa ............... H04M 3/42
379/214.01
5,533,094 A * 7/1996 Sanmugam ........... H04W 68/08
340/7.27

(Continued)

FOREIGN PATENT DOCUMENTS

CN      101330312 A      12/2008
CN      103152798 A       6/2013

(Continued)

OTHER PUBLICATIONS

Intel Corp: "Remaining Details on Paging Enhancements for MTC," R1-155304, 3GPP TSG RAN WGI Meeting #82 bis Oct. 9, 2015 (Oct. 9, 2015) vol. 2.1-2.2, 7 pages.

(Continued)

*Primary Examiner* — Khalid W Shaheed
(74) *Attorney, Agent, or Firm* — Arent Fox, LLP

(57) ABSTRACT

Aspects of the present disclosure describe receiving paging messages in wireless communications. A user equipment (UE) can receive one or more parameters for descrambling non-cell specific paging messages. The UE can receive, from one or multiple base stations, a non-cell specific paging message. The UE can descramble the non-cell specific paging message based at least in part on the one or more parameters.

30 Claims, 13 Drawing Sheets

(56) References Cited

U.S. PATENT DOCUMENTS

| | | | |
|---|---|---|---|
| 9,826,434 B2* | 11/2017 | Chu | H04W 28/20 |
| 2009/0290575 A1* | 11/2009 | Simon | H04L 12/189 |
| | | | 370/352 |
| 2010/0272004 A1* | 10/2010 | Maeda | H04L 5/0007 |
| | | | 370/312 |
| 2011/0002250 A1* | 1/2011 | Wang | H04W 76/40 |
| | | | 370/311 |
| 2011/0205952 A1* | 8/2011 | Gou | H04W 72/1278 |
| | | | 370/312 |
| 2011/0207481 A1* | 8/2011 | Yin | H04W 68/005 |
| | | | 455/458 |
| 2012/0307764 A1 | 12/2012 | Zhao et al. | |
| 2013/0136072 A1 | 5/2013 | Bachmann et al. | |
| 2014/0010139 A1 | 1/2014 | Choi et al. | |
| 2015/0092768 A1* | 4/2015 | Ng | H04J 11/0069 |
| | | | 370/350 |
| 2017/0048047 A1* | 2/2017 | Kadous | H04L 1/1887 |
| 2017/0374704 A1* | 12/2017 | Sharma | H04W 84/02 |

FOREIGN PATENT DOCUMENTS

| | | |
|---|---|---|
| EP | 1507432 A2 | 2/2005 |
| EP | 3240338 A1 | 11/2017 |
| GN | 103380648 A | 10/2013 |
| KR | 20160002327 A | 1/2016 |
| WO | 2006095213 A1 | 9/2006 |
| WO | WO-2010044600 A2 | 4/2010 |
| WO | WO-2016112510 A1 | 7/2016 |

OTHER PUBLICATIONS

International Search Report—PCT/CN2018/071890—ISA/EPO—dated Mar. 27, 2018.

International Search Report and Written Opinion—PCT/CN2017/070859—ISA/EPO—dated Sep. 27, 2017.

Intel Corp: "System Information Modification for Release—13 Low Complexity UEs and Enhanced Coverage," R2-154378, 3GPP TSG RAN WG2 Meeting #91 bis, Oct. 9, 2015(Oct. 9, 2015) vol. 2.3, 5 pages.

Supplementary European Search Report—EP18738762—Search Authority—BERLIN—dated Sep. 18, 2020.

* cited by examiner

TECHNIQUES FOR BROADCASTING PAGING MESSAGES IN WIRELESS COMMUNICATIONS

CROSS-REFERENCE TO RELATED APPLICATION

This application is a 35 U.S.C. § 371 National Phase Application of PCT Application No. PCT/CN2018/071890 filed Jan. 9, 2018, entitled "TECHNIQUES FOR BROADCASTING PAGING MESSAGES IN WIRELESS COMMUNICATIONS," which claims priority to PCT Application No. PCT/CN2017/070859 filed Jan. 11, 2017, entitled "TECHNIQUES FOR BROADCASTING PAGING MESSAGES IN WIRELESS COMMUNICATIONS," which are assigned to the assignee hereof and hereby expressly incorporated by reference herein.

BACKGROUND

Aspects of the present disclosure relate generally to wireless communication systems, and more particularly, to broadcasting paging messages in wireless communication systems.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

Currently, in LTE, paging for a user equipment (UE) is performed by a cell on which the UE is camped, and is scrambled by a cell-specific identifier. For example, for 5G communications technology and beyond, a UE may be within coverage of a number of cells or related access points. Thus, improvements in transmitting paging messages may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for receiving paging messages in wireless communications is provided. The method includes receiving, by a user equipment (UE), one or more parameters for descrambling non-cell specific paging messages, receiving, by the UE from one or multiple base stations, a non-cell specific paging message, and descrambling, by the UE, the non-cell specific paging message based at least in part on the one or more parameters.

In another example, a method for transmitting paging messages in wireless communications is provided. The method includes receiving, by a base station, a multicast message from a core network, wherein the multicast message includes a paging message for broadcasting in a wireless network, and broadcasting, by the base station in conjunction with one or more other base stations, the paging message.

In another example, a method for transmitting paging messages in wireless communications is provided that includes obtaining a paging message related to at least one UE, and multicasting the paging messages to a plurality of base stations for broadcasting to the UE.

In another example, an apparatus for receiving paging messages in wireless communications is provided. The apparatus includes a transceiver for communicating one or more wireless signals via one or more antennas, a memory configured to store instructions, and one or more processors communicatively coupled with the transceiver and the memory. The one or more processors are configured to receive one or more parameters for descrambling non-cell specific paging messages, receive, from one or multiple base stations, a non-cell specific paging message, and descramble the non-cell specific paging message based at least in part on the one or more parameters.

In another example, an apparatus for transmitting paging messages in wireless communications is provided. The apparatus includes a transceiver for communicating one or more wireless signals via one or more antennas, a memory configured to store instructions, and one or more processors communicatively coupled with the transceiver and the memory. The one or more processors are configured to receive a multicast message from a core network, wherein the multicast message includes a paging message for broadcasting in a wireless network, and broadcasting, in conjunction with one or more other base stations, the paging message In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
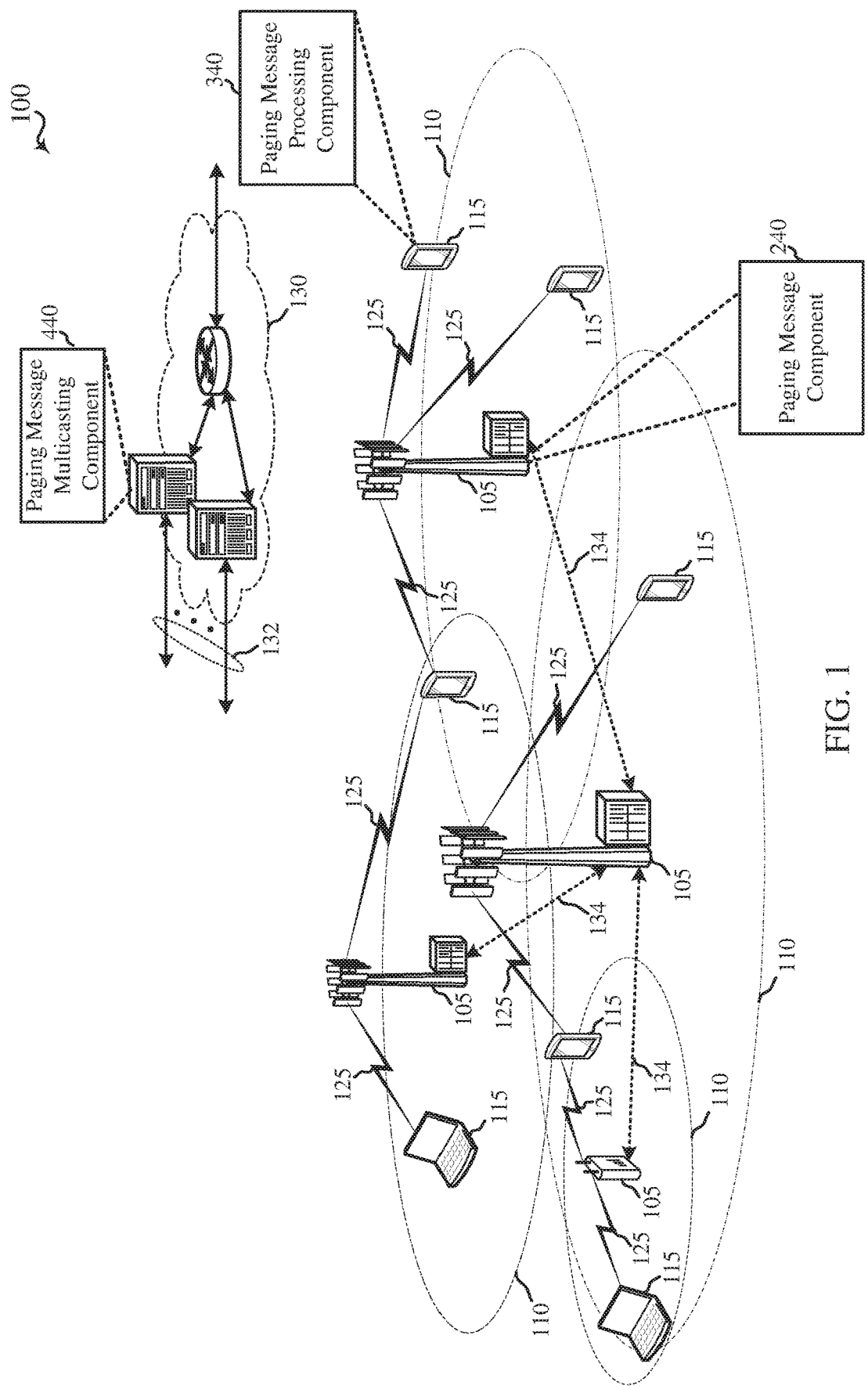
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to multicasting paging messages to multiple base stations for transmitting in a non-cell specific manner. In this regard, a user equipment (UE) near at least a portion of the multiple base stations can receive the paging message as a non-cell specific message from one or more of the multiple base stations without having to decode multiple paging messages from multiple base stations. Moreover, in this example, the multiple base stations can join an internet protocol (IP) multicast group, and the core network can multicast the paging messages to the multiple base stations for transmitting in the non-cell specific manner. In an example, the multiple base stations can associate the paging message with the same virtual cell identifier and/or can transmit the paging messages similarly to a multicast-broadcast single-frequency network (MBSFN) message. The UE can receive one or more messages from one or more of the base stations, and may combine the one or more messages for processing.

In addition, for example, the paging messages may include additional parameters, such as a flow identifier, a bearer identifier, a slice identifier, a caller identifier, etc. Further, in an example, the paging message may include downlink data, which may be useful to transmit the downlink data without requiring the UE to establish a RRC connection (e.g., for machine type (MT) communications). In one example, the base stations can utilize a different radio network temporary identifier to schedule the paging message that is to include downlink data. The UE can accordingly determine that the paging message is to include downlink data based on the associated RNTI.

In an example, there can be multiple kinds of paging in cellular wireless communication system, including core network (CN) paging and radio access network (RAN) paging. CN paging is initiated by CN. RAN paging is initiated by RAN. In both kinds of paging, the paging messages are sent to a paging area. Each paging area can include multiple base stations, e.g. eNBs/gNBs. In current 2G/3G/4G systems, the same paging message is sent from the originating node (CN or anchor gNB/eNB) to the base stations of the paging area in terms of unicast. Sending the same paging message to multiple base stations, however, may not be an efficient way from backhaul transmission perspective. It may also increase the control plane delay of MT service/access. Accordingly, as described further herein, paging messages may be sent over the backhaul using multicast (e.g., internet protocol (IP) multicast).

In addition, in over-the-air (OTA) interface of current 2G/3G/4G systems, paging messages are sent by each cell of the paging area respectively. The paging messages are cell-specifically scrambled, and different cells may have different paging configurations. This can result in paging occasion (PO)/paging frame (PF) in different cells being in different time. Each paging message can include multiple paging records to multiple UEs. This may also result the paging messages sent by different cells being different. All these reasons may prevent a UE from combining the paging messages from multiple cells, e.g. in terms of MBSFN. Thus, in current 2G/3G/4G systems, paging messages sent by each cell may not be able to be combined even in a synchronized network. Accordingly, as described herein, paging messages can be sent in terms of MBSFN. With MBSFN-type transmission of paging signals, the signal-to-noise ratio (SNR) of the paging messages may be improved, which may allow for additional paging message capacity. This can enable paging messages to carry more information, e.g. caller ID, bearer ID, flow ID, slice ID, etc. This can also increase the paging success rate.

Also, in LTE, the paging message capacity may be too small to carry the caller ID in circuit-switched fallback (CSFB). This may prevent the UE from rejecting the incoming call per caller ID before fallback to 2G/3G. Current paging messages do not have flow ID or bearer ID information for UE to selectively respond to paging. Due to capacity limitation, current paging message cannot carry some of these additional parameters. Accordingly, as described herein, using the MBSFN-type transmission can allow for including flow ID, bearer ID, slice ID, etc. into the paging message. Also, for small downlink (DL) data transmission to a UE in an inactive state (e.g., RRC_INACTIVE state), it may not be efficient to bring UE to a connected state (e.g., RRC_CONNECTED) to send the small amount of DL data to the UE. Accordingly, as described herein, DL small data can be included into paging record of the paging message (e.g., which may be enabled by using the MBSFN-type transmission for the paging message) to avoid the UE having to enter the connected state to receive the data.

The described features will be presented in more detail below with reference to FIGS. 1-13.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A media access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communication system 100, a node of the core network 130 may include a paging message multicasting component 440 for multicasting a paging message intended for a UE 115 to a plurality of base stations for transmission thereof. One or more of the base stations 105 may include a paging message component 240 for receiving the multicast paging message and transmitting the paging message to one or more UEs 115 in a non-cell specific manner. UE 115 may include paging message processing component 340 for obtaining the paging message in the non-cell specific manner, and descrambling the paging message (e.g., based on a virtual cell identifier that can be common among the base stations 105 for transmitting paging messages).

Figure 3:
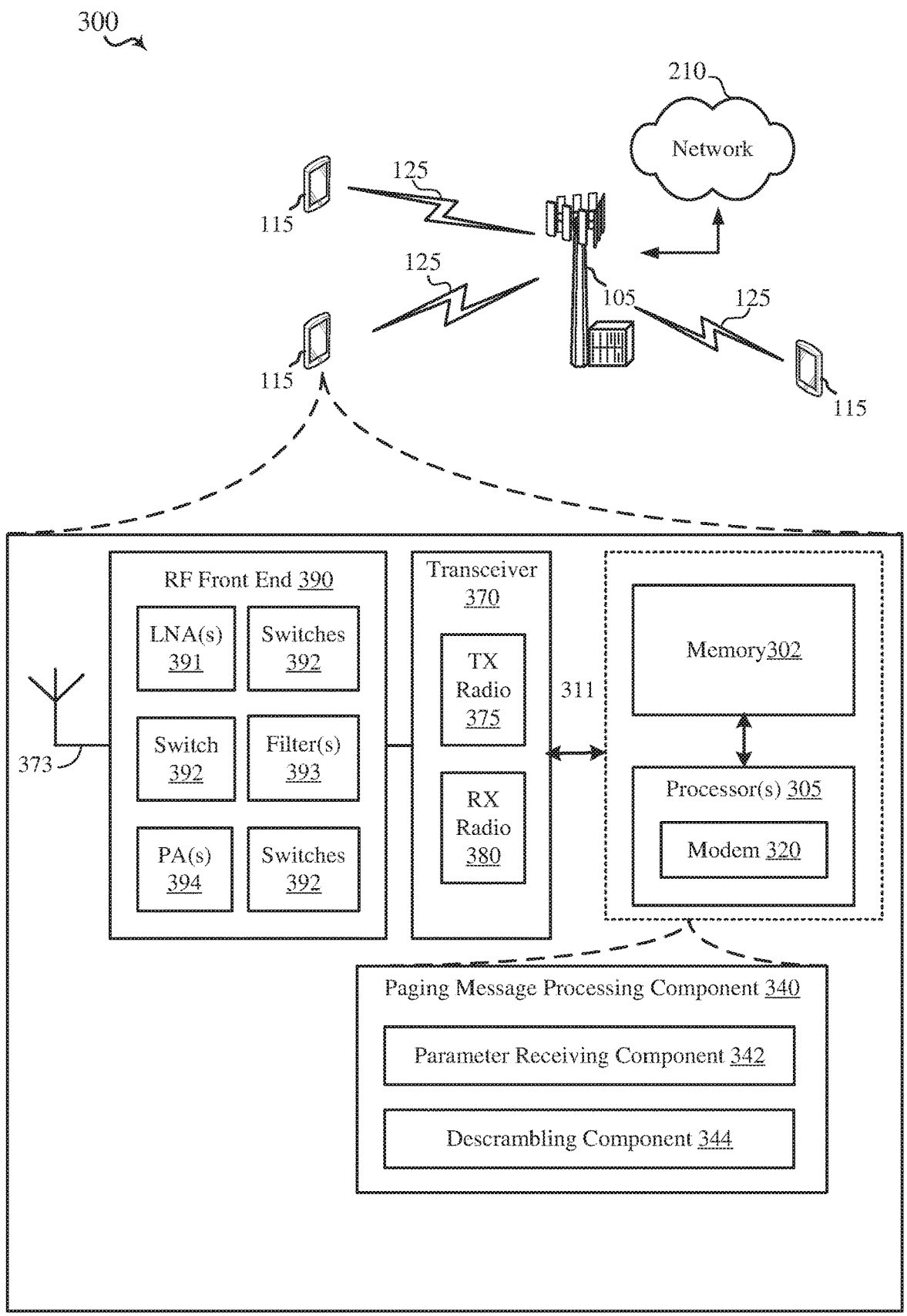
FIG. 3 is a block diagram illustrating an example of a UE, in accordance with various aspects of the present disclosure.
Figure 4:
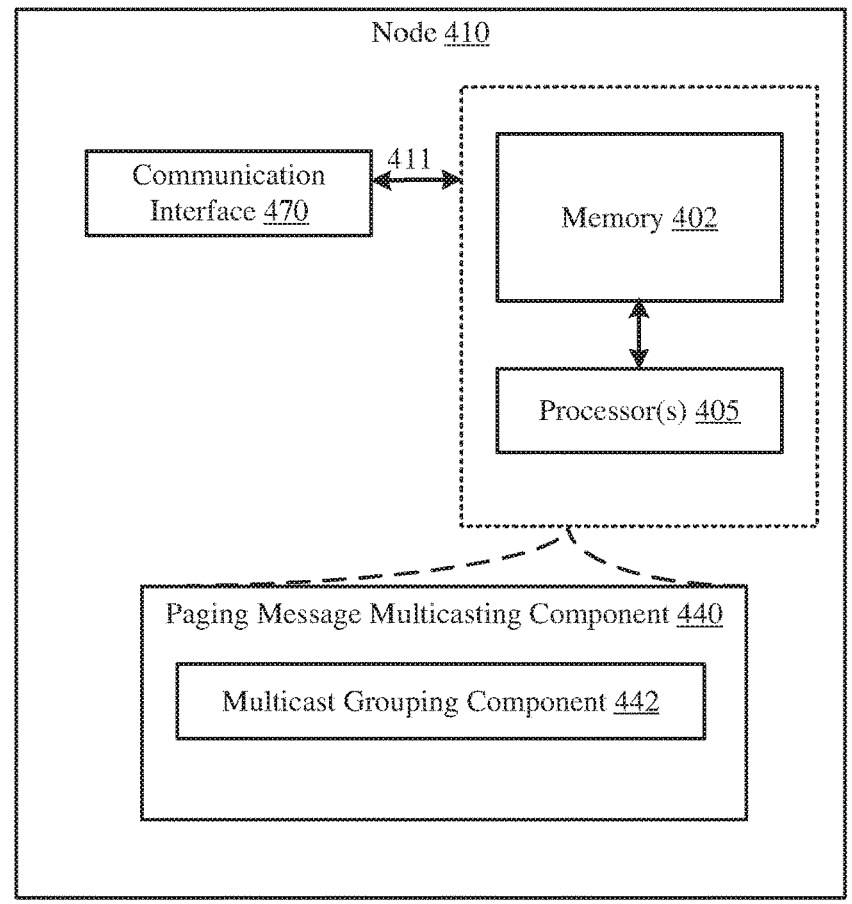
FIG. 4 is a block diagram illustrating an example of a core network node, in accordance with various aspects of the present disclosure.
Figure 4:
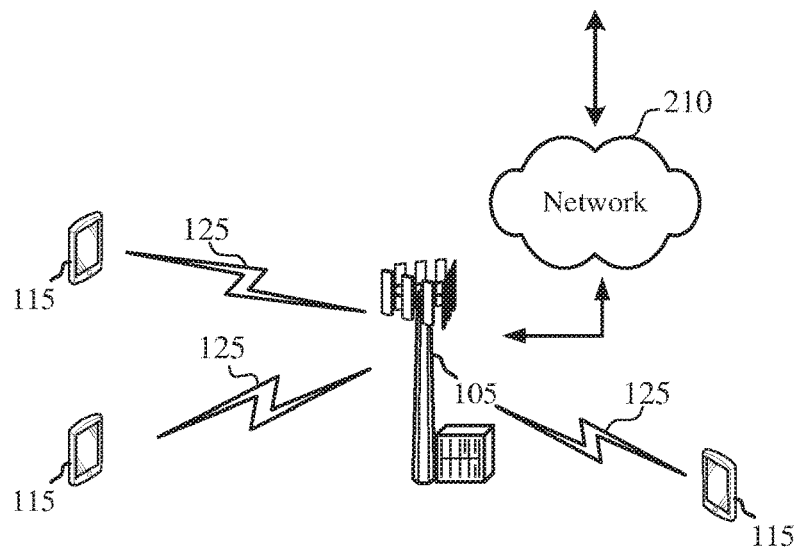
Figure 5:
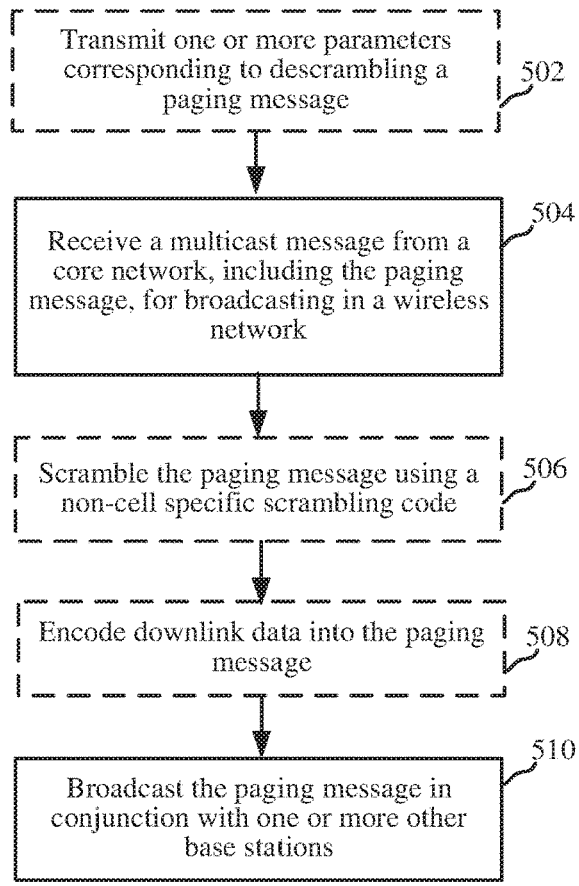
FIG. 5 is a flow chart illustrating an example of a method for broadcasting paging messages, in accordance with various aspects of the present disclosure.
Figure 6:
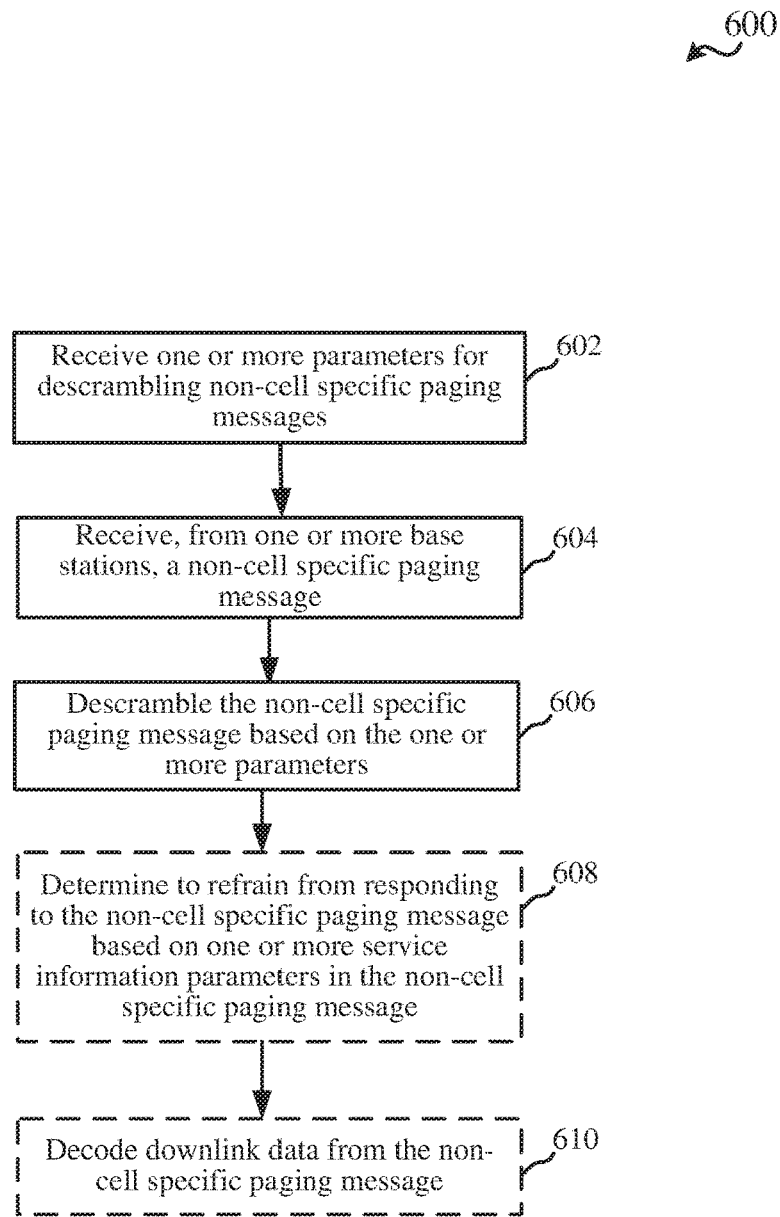
FIG. 6 is a flow chart illustrating an example of a method for processing paging messages, in accordance with various aspects of the present disclosure.
Figure 7:
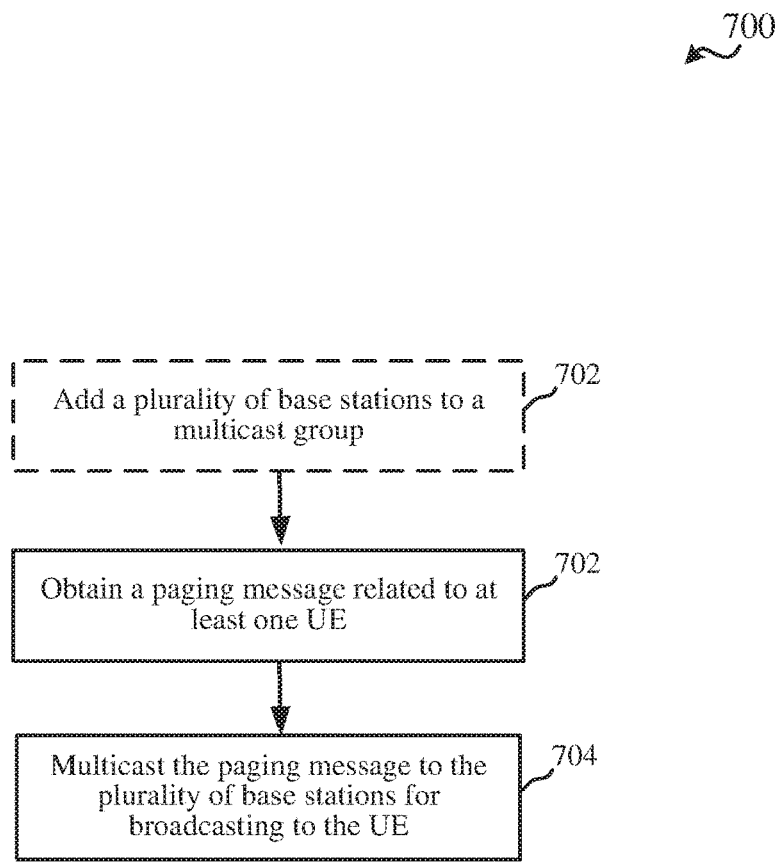
FIG. 7 is a flow chart illustrating an example of a method for multicasting paging messages, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 5-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
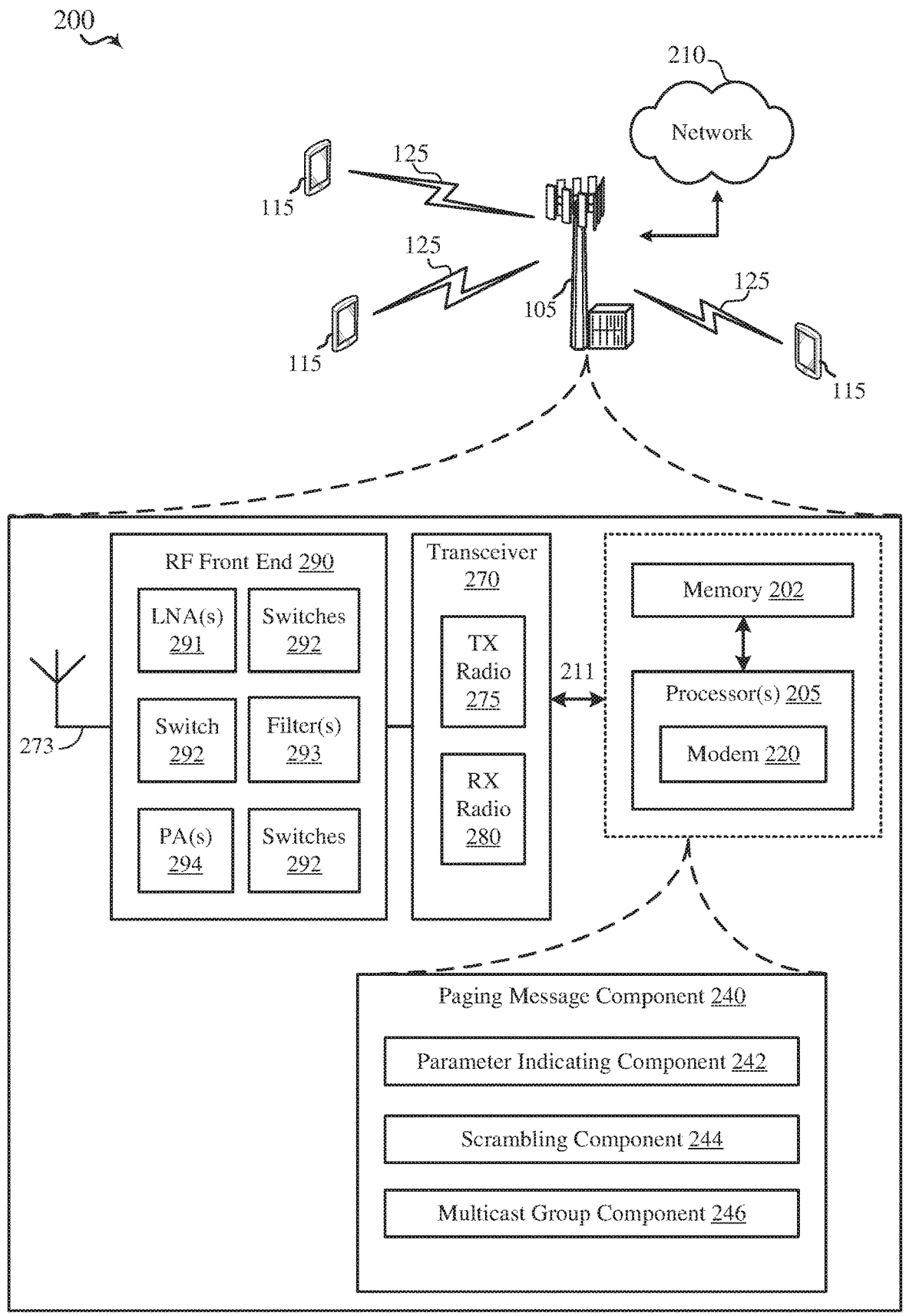
FIG. 2 is a block diagram illustrating an example of a base station, in accordance with various aspects of the present disclosure.

Referring to FIG. 2, a block diagram 200 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to receive paging messages from multiple base stations in a non-cell specific manner. Moreover the base station 105 may be an example of the base stations described in the present disclosure (e.g., eNB, gNB, etc. providing one or more macrocells, small cells, etc.) that are configured to broadcast paging messages in a non-cell specific manner. The base station 105 may communicate with the network 210 as well, which may include one or more nodes described in the present disclosure that are configured to multicast paging messages to a plurality of base stations 105 for transmitting to the UEs 115.

In an aspect, the base station in FIG. 2 may include one or more processors 205 and/or memory 202 that may operate in combination with a paging message component 240 to perform the functions, methodologies (e.g., method 500 of FIG. 5), or methods presented in the present disclosure. In accordance with the present disclosure, the paging message component 240 may include a parameter indicating component 242 for indicating one or more parameters to the UE 115 for processing a non-cell specific paging message, a scrambling component 244 for scrambling a non-cell specific paging message based on a virtual cell identifier or other non-cell specific parameter, and a multicast group component 246 for joining a multicast group with a radio access network (RAN) or core network (CN) 210 for receiving paging messages to transmit in a non-cell specific manner. For example, paging message component 240 may transmit the one or more parameters and/or non-cell specific paging messages over one or more communication links 125.

The one or more processors 205 may include a modem 220 that uses one or more modem processors. The various functions related to the paging message component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the paging message component 240. In another example, paging message component 240 may operate at one or more communication layers, such as a PDCP layer, an RLC layer, etc., to configure parameters for transmitting paging messages.

In some examples, the paging message component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the paging message component 240 to the UEs. RF front end 290 may be connected to one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels, transmitting and receiving signals, etc. In an aspect, the components of the RF front end 290 can connect with transceiver 270. The transceiver 270 may connect to one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or paging message component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining paging message component 240 and/or one or more of its sub-components. Additionally or alternatively, the base station 105 may include a bus 211 for coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 11. Similarly, the memory 202 may correspond to the memory described in connection with the base station in FIG. 11.

Referring to FIG. 3, a block diagram 300 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to receive paging messages from multiple base stations in a non-cell specific manner. Moreover the base station 105 may be an example of the base stations described in the present disclosure (e.g., eNB, gNB, etc. providing one or more macrocells, small cells, etc.) that are configured to broadcast paging messages in a non-cell specific manner. The base station 105 may communicate with the network 210 as well, which may include one or more nodes described in the present disclosure that are configured to multicast paging messages to a plurality of base stations 105 for transmitting to the UEs 115.

In an aspect, the UE 115 in FIG. 3 may include one or more processors 305 and/or memory 302 that may operate in combination with a paging message processing component 340 to perform the functions, methodologies (e.g., method 600 of FIG. 6), or methods presented in the present disclosure. In accordance with the present disclosure, the paging message processing component 340 may include a parameter receiving component 342 for obtaining one or more parameters for processing paging messages received in a non-cell specific manner from one or more base stations 105, and/or a descrambling component 344 for descrambling paging messages that are received from one or more base stations 105 in a non-cell specific manner.

The one or more processors 305 may include a modem 320 that uses one or more modem processors. The various functions related to the paging message processing component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the paging message processing component 340. In another example, paging message processing component 340 may operate at one or more communication layers, such as a PDCP layer, an RLC layer, etc., to process and/or prioritize packets or generate related PDUs over the one or more communication layers.

In some examples, the paging message processing component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals that include the packets (e.g., and/or one or more related PDUs) received by the paging message processing component 340. RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or paging message processing component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining paging message processing component 340 and/or one or more of its sub-components. Additionally or alternatively, the UE 115 may include a bus 311 for coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 11. Similarly, the memory 302 may correspond to the memory described in connection with the UE in FIG. 11.

Referring to FIG. 4, a block diagram 400 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to receive paging messages from multiple base stations in a non-cell specific manner. Moreover the base station 105 may be an example of the base stations described in the present disclosure (e.g., eNB, gNB, etc. providing one or more macrocells, small cells, etc.) that are configured to broadcast paging messages in a non-cell specific manner. The base station 105 may communicate with the network 210 as well, which may include one or more nodes 410 described in the present disclosure that are configured to multicast paging messages to a plurality of base stations 105 for transmitting to the UEs 115. For example, the one or more nodes 410 may include a radio network controller (RNC), a cell broadcast center (CBC), one or more gateways, such as a serving gateway (SGW), packet data network (PDN) gateway, mobility management entity (MME), or substantially any node that communicates with one or more base stations 105, and may multicast messages to multiple base stations 105.

In an aspect, the node 410 in FIG. 4 may include one or more processors 405 and/or memory 402 that may operate in combination with a paging message multicasting component 440 to perform the functions, methodologies (e.g., method 700 of FIG. 7), or methods presented in the present disclosure. In accordance with the present disclosure, the paging message multicasting component 440 may include a multicast grouping component 442 for grouping a plurality of base stations 105 in a multicast group for multicasting one or more paging messages thereto.

The various functions related to the paging message multicasting component 440, and/or its sub-components, may be included in processor 405 and, in an aspect, can be executed by a single processor, while in other aspects, different ones of the functions may be executed by a combination of two or more different processors. For example, in an aspect, the one or more processors 405 may include a system-on-chip (SoC). In particular, the one or more processors 405 may execute functions and components included in the paging message multicasting component 440.

In some examples, the paging message multicasting component 440 and each of the sub-components may comprise hardware, firmware, and/or software and may be configured to execute code or perform instructions stored in a memory (e.g., a computer-readable storage medium, such as memory 402 discussed below). Moreover, in an aspect, the node 410 in FIG. 4 may include a communication interface 470 for receiving and transmitting communications to, for example, base stations 105. The communication interface 470 may include a wired or wireless network interface for communicating with the base station 105.

The node 410 in FIG. 4 may further include a memory 402, such as for storing data used herein and/or local versions of applications or paging message multicasting component 440 and/or one or more of its sub-components being executed by processor 405. Memory 402 can include any type of computer-readable medium usable by a computer or processor 405, such as RAM, ROM, tapes, magnetic discs, optical discs, volatile memory, non-volatile memory, and any combination thereof. In an aspect, for example, memory 402 may be a computer-readable storage medium that stores one or more computer-executable codes defining paging message multicasting component 440 and/or one or more of its sub-components. Additionally or alternatively, the node 410 may include a bus 411 for coupling one or more of the communication interface 470, the memory 402, or the processor 405, and to exchange signaling information between each of the components and/or sub-components of the node 410.

FIG. 5 illustrates a flow chart of an example of a method 500 for broadcasting (e.g., by a base station) paging messages in a non-cell specific manner.

At Block 502, the base station can optionally transmit one or more parameters corresponding to descrambling a paging message. In an aspect, parameter indicating component 242, e.g., in conjunction with processor(s) 205, memory 202, transceiver 270, and/or paging message component 240, can transmit the one or more parameters corresponding to descrambling the paging message. For example, parameter indicating component 242 can transmit the one or more parameters to one or more UEs 115 in a system information broadcast, in dedicated signaling, in a RRC configuration, etc. In addition, for example, the one or more parameters may correspond to descrambling a non-cell specific paging message, and may include parameters such as a virtual cell identifier used by the base station 105 and/or one or more additional base stations for scrambling non-cell specific paging messages.

As described further herein, for example, the one or more parameters may correspond to UEs in a RAN notification area or a group of UEs (e.g., as determined by the base station 105). In this example, parameter indicating component 242 can send the one or more parameters to UEs using RRC signaling. In another example, where the one or more parameters may correspond to UEs in a cell provided by the base station 105, parameter indicating component 242 can additionally or alternatively signal the one or more parameters in system information.

At Block 504, the base station can receive a multicast message from a core network, including the paging message, for broadcasting in a wireless network. In an aspect, paging message component 240, e.g., in conjunction with processor(s) 205, memory 202, transceiver 270, etc., can receive the multicast message from the core network (e.g., network 210), including the paging message, for broadcasting in the wireless network. In an example, multicast group component 246 can join a multicast group (e.g., an IP multicast group) with the core network 210 for receiving the multicast paging messages that correspond to one or more UEs in a paging area defined by the base stations in the multicast group. For example, core network (e.g., network 210) can deliver the IP multicast address to the base station 105 for receiving the multicast communications, and/or the multicast address may be configured via operations, administration, and management (OAM). In addition, for example, each paging area in a core network (e.g., each tracking area) may be configured with one IP multicast area (e.g., may be associated with an IP multicast address). Thus, for example, the OAM may configure base station 105 with an IP multicast address corresponding to its associated tracking area. Accordingly, in any case, the paging message component 240 can receive the paging message from the core network 210 in an IP multicast message.

Moreover, for example, the multicast message from the core network may include one or more parameters related to, or to use in, generating and/or transmitting the paging message, such as the paging record, PO/PF parameters (e.g., international mobile subscriber identifier (IMSI), discontinuous receive (DRX) cycle parameters, etc.), scrambling parameters (e.g., a scrambling code or related non-cell specific identifier), modulation and coding scheme (MCS), etc., to allow the base station 105 to transmit the same paging message as other base stations in a cell group. For example, inclusion of the one or more parameters may be enabled based at least in part on the improved SNR achieved by broadcasting the same paging message from multiple base stations 105.

At Block 506, the base station can optionally scramble the paging message using a non-cell specific scrambling code. In an aspect, scrambling component 244, e.g., in conjunction with processor(s) 205, memory 202, transceiver 270, etc., can scramble the paging message using the non-cell specific scrambling code. For example, the non-cell specific scrambling code can be used by multiple base station for scrambling the paging message, such that the UE 115 can receive the same scrambled paging message from multiple base stations (and thus may combine the paging messages received for descrambling/processing thereof). As described, for example, the non-cell specific scrambling code may be based on a virtual cell identifier known and used by the base stations 105 in the multicast group. In one example, the non-cell specific scrambling code may be indicated in the multicast message received from the core network 210, or may otherwise be configured for, or known by, base stations in the multicast group.

At Block 508, the base station can optionally encode downlink data into the paging message. In an aspect, paging message component 240, e.g., in conjunction with processor(s) 205, memory 202, transceiver 270, etc., can encode the downlink data into the paging message. For example, paging message component 240 can encode small downlink data into a PDCP PDU of the paging message to allow for transmitting the small downlink data to a UE 115 (e.g., in MT communication) so the UE 115 need not establish an RRC connection to receive the small downlink data. Moreover, in an example, the paging message component 240 may associate the paging message that includes the small downlink data with a different RNTI than a paging message that does not include the small data. For example, the different RNTI can be reserved for the system, common for all UEs in a RAN paging area, common for all UEs in a cell, common for a group of UEs, etc. This can allow the UE 115 to differentiate between paging messages with and without small downlink data. In an example, the downlink data and/or corresponding RNTI may be indicated in the multicast message received from the core network 210.

In addition, for example, the base station 105 can send the RNTI to the UE by RRC signaling during RRC connection suspending or RRC Connection Reconfiguration. In another example, the RNTI may be delivered to UE either by system information or RRC signaling. The DRX pattern for the new RNTI may be the same as for the paging message or different from the paging message. If different from paging message DRX (PO/PF), the base station 105 or other RAN node can notify the UE of the DRX pattern by either dedicated RRC signaling or system information, etc.

At Block 510, the base station can broadcast the paging message in conjunction with one or more other base stations. In an aspect, paging message component 240, e.g., in conjunction with processor(s) 205, memory 202, transceiver 270, etc., can broadcast the paging message in conjunction with the one or more other base stations so a UE 115 can receive the same non-cell specific paging message from multiple base stations 105. For example, paging message component 240 can transmit the paging message with a same content, same MCS, same scrambling, same timing, same PO/PF, etc. as the other base stations (e.g., intra-frequency member cells), where information related to transmitting the paging message may be included in the multicast message received from the core network 210. In addition, in one example, a cyclic prefix length of the paging message can be the same or different as that used by the base station 105 in transmitting a unicast message.

In some examples, the paging message may correspond to a public warning system (PWS), earthquake and tsunami warning system (ETWS), or substantially any sort of public announcement system where a message can be broadcast to UEs to cause the UEs receiving the message to display the message, connect to the base station 105 to receive additional information about the public announcement, etc. In this example, the base stations 105 can additionally or alternative join a multicast group with a CBC that generates the public announcement messages, and the CBC can accordingly multicast public announcement messages to the base stations 105 (e.g., via IP multicast) to cause the base stations 105 to provide coordinated broadcast of the public announcement messages (e.g., with similar parameters, at similar times, etc., as described above). In addition, the base station 105 can associate the public announcement messages with a certain RNTI, such as a system information (SI)-RNTI, when broadcasting the public announcement messages to the UEs 115.

FIG. 6 illustrates a flow chart of an example of a method 600 for processing (e.g., by a UE) paging messages received from one or more base stations.

In method 600, at Block 602, the UE can receive one or more parameters for descrambling non-cell specific paging messages. In an aspect, parameter receiving component 342, e.g., in conjunction with processor(s) 305, memory 302, transceiver 370, and/or paging message processing component 340, can receive the one or more parameters for descrambling non-cell specific paging messages. For example, parameter receiving component 342 can receive the one or more parameters from a base station 105, a stored configuration, etc. For instance, as described, parameter receiving component 342 can receive the one or more parameters in broadcast signaling, dedicated signaling, RRC signaling, etc., from the base station 105. In one example, the one or more parameters may include a non-cell specific scrambling code or corresponding virtual cell identifier that can be used for descrambling the non-cell specific paging messages.

At Block 604, the UE can receive, from one or more base stations, a non-cell specific paging message. In an aspect, paging message processing component 340, e.g., in conjunction with processor(s) 305, memory 302, transceiver 370, etc. can receive, from the one or more base stations 105, the non-cell specific paging message. For example, the paging message processing component 340 can receive the non-cell specific paging message as transmitted from a plurality of base stations 105 and can combine the non-cell specific paging message. As described, in an example, a cyclic prefix length of the paging message is the same or different as that for a unicast message At Block 606, the UE can descramble the non-cell specific paging message based on the one or more parameters. In an aspect, descrambling component 344, e.g., in conjunction with processor(s) 305, memory 302, transceiver 370, etc. can descramble the non-cell specific paging message based on the one or more parameters. For example, the UE 115 can apply a scrambling code to descramble the paging message, where the scrambling code can be based on the one or more parameters received for descrambling non-cell specific paging messages. As described, in one example, descrambling component 344 can receive the scrambling code from memory in the UE 115, in the one or more parameters received for descrambling non-cell specific paging messages, etc.

At Block 608, the UE can optionally determine to refrain from responding to the non-cell specific paging message based on one or more service information parameters in the non-cell specific paging message. In an aspect, paging message processing component 340, e.g., in conjunction with processor(s) 305, memory 302, transceiver 370, etc. can determine to refrain from responding to the non-cell specific paging message based on the one or more service information parameters in the non-cell specific paging message. As described, the non-cell specific paging message may include additional service information parameters, such as a caller ID, flow ID, bearer ID, slice ID, etc., which may be enabled based on improved SNR by transmitting the non-cell specific paging message using multiple base stations, and the paging message processing component 340 can determine whether to ignore the non-cell specific paging message (e.g., whether to remain in an RRC_INACTIVE state or enter an RRC_CONNECTED state) based on the one or more service parameters.

At Block 610, the UE can optionally decode downlink data from the non-cell specific paging message. In an aspect, paging message processing component 340, e.g., in conjunction with processor(s) 305, memory 302, transceiver 370, etc. can decode the downlink data from the non-cell specific paging message. As described, the non-cell specific paging message may include small downlink data. For example, this may be enabled based on improved SNR when transmitting the non-cell specific paging message using multiple base stations. Additionally, the presence of the small downlink data may be indicated based on a RNTI associated with the non-cell specific paging message. As described, in an example, the base station 105, core network node, etc. may configure the UE 115 with the RNTI using RRC signaling, system information broadcast, etc., e.g., depending on whether RNTIs are assigned at a system level, for UEs in a RAN notification area, for a group of UEs, for UEs in a cell provided by the base station 105, etc. Thus, for example, where paging message processing component 340 determines that the non-cell specific paging message is associated with the corresponding RNTI, paging message processing component 340 can decode small DL data from the non-cell specific paging message (e.g., to avoid entering a RRC_CONNECTED state to receive the small amount of DL data).

FIG. 7 illustrates a flow chart of an example of a method 700 for multicasting (e.g., by a node of a core network, an anchor base station, etc.) paging messages from one or more UEs.

In method 700, at Block 702, the core network node can optionally add a plurality of base stations to a multicast group. In an aspect, multicast grouping component 442, e.g., in conjunction with processor(s) 305, memory 302, transceiver 370, and/or paging message multicasting component 440, can add the plurality of base stations (e.g., base stations 105) to the multicast group. For example, the base stations 105 may request to be added to the multicast group to receive multicasted paging messages for broadcasting to the UE. In another example, the base stations 105 may manage associations of one another in the multicast group, which may include a base station 105 requesting addition to the multicast group from another base station.

At Block 704, the core network node, anchor base station, etc. can obtain a paging message related to at least one UE. In an aspect, paging message multicasting component 440, e.g., in conjunction with processor(s) 305, memory 302, transceiver 370, etc., which may be present in the core network node or an anchor base station with multicasting functionality, can obtain the paging message related to at least one UE. For example, the paging message multicasting component 440 can receive the paging message from one or more other core network components, which may correspond to a page related to a call or message sent to the at least one UE. In one example, the anchor base station may register itself as the anchor base station for a group of base stations (e.g., with a core network node) and may accordingly receiving the paging message from the core network node. For example, the UE 115 may be operating in a RRC_INACTIVE state, and the paging message may be sent to the UE 115 to notify the UE 115 of the incoming message, call, etc.

At Block 706, the core network node, anchor base station, etc. can multicast the paging message to the plurality of base stations for broadcasting to the UE. In an aspect, paging message multicasting component 440, e.g., in conjunction with processor(s) 305, memory 302, transceiver 370, etc. can multicast the paging message to the plurality of base stations (e.g., base stations 105) for broadcasting to the UE (e.g., UE 115). For example, the paging message multicasting component 440 can multicast the paging message to the base stations 105 in a multicast group (e.g., using IP multicasting). In addition, the paging message multicasting component 440 can include one or more parameters for broadcasting the paging message, such as a paging record, PO/PF parameters, scrambling code, MCS, timing information, etc., to allow the base stations to transmit the same paging message. In this regard, base stations in the multicast group can receive the non-cell specific paging message, and can generate and/or broadcast the paging message using similar parameters. Thus, a UE can receive the same non-cell specific paging message from multiple base stations, as described, which can improve SNR of the paging message.

Figure 8:
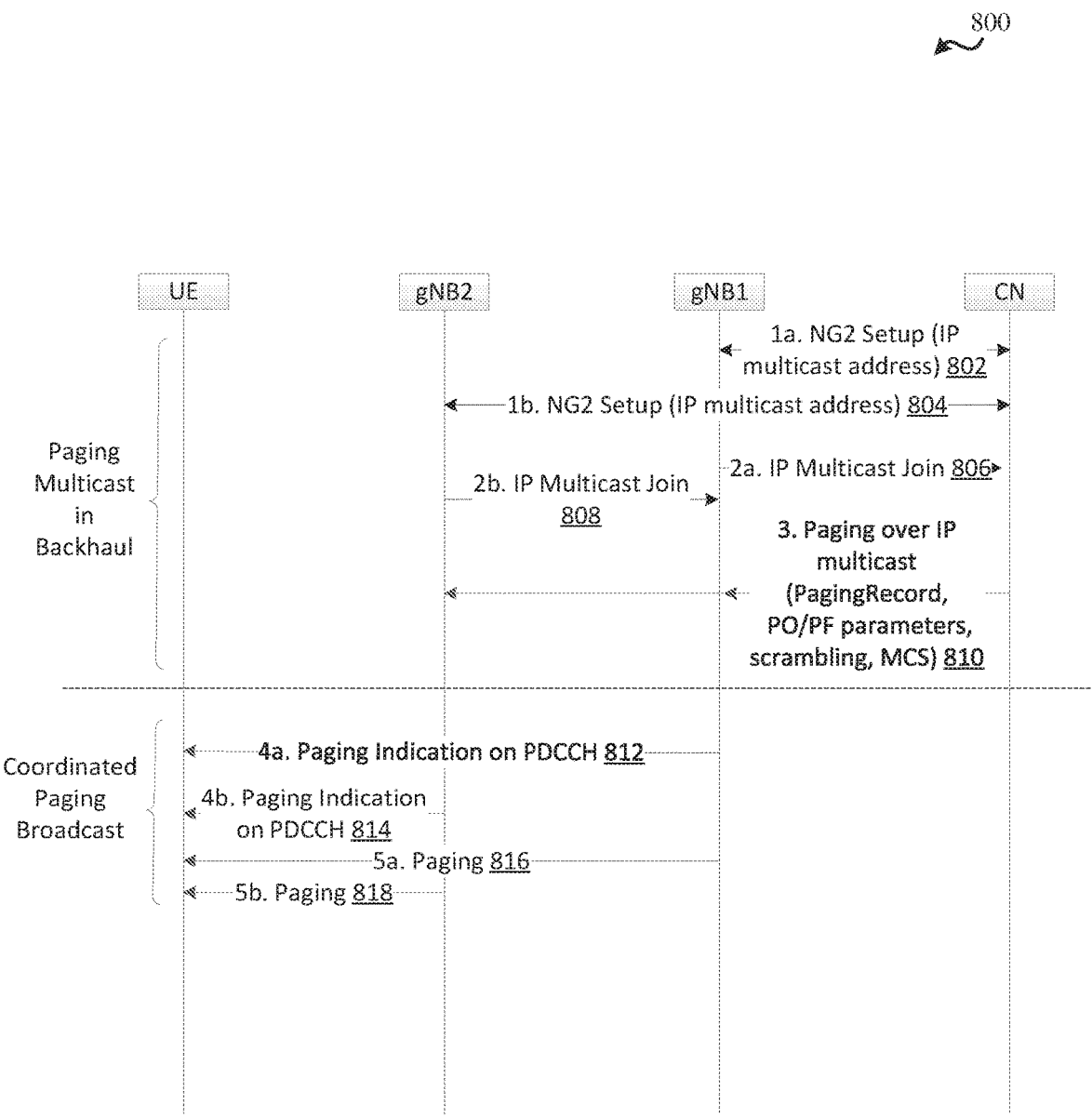
FIG. 8 is a block diagram illustrating an example of a system for multicasting paging messages, in accordance with various aspects of the present disclosure.

FIG. 8 illustrates an example of a wireless communication system 800 including a UE, gNBs, and CN components for multicasting paging messages, as described herein. Though two gNBs are shown, in some examples additional gNBs can be present and can perform similar functions as gNB1 and gNB2. In the system 800, gNB1 can setup NG2 connection over an NG2 interface with CN at 802, and gNB2 can setup NG2 connection over an NG2 interface with CN at 804. The IP multicast address can be delivered to the gNBs during NG2 setup. Alternatively, the IP multicast address may be configured to gNBs via OAM. Each CN paging area, e.g. tracking area, can be configured with one IP multicast address. gNB1 can join the IP multicast group at 8066, and gNB2 can join the IP multicast group at 808, which can follow an IP multicast protocol, e.g. IPv4 internet group management protocol (IGMP) or IPv6 multicast listener discovery (MLD).

When CN initiates a paging, CN multicasts the paging message to the member gNBs using IP multicast protocol. For example, at 810, the CN can transmit paging over IP multicast and may include a paging record, PO/PF parameters, scrambling code, MCS, etc. To enjoy the MBSFN-type transmission gain, the member cells of CN paging area can send the paging with the same signal, e.g., same content, same MCS, same scrambling, at same time, in the intra-frequency member cells. For example, gNB1 can transmit a paging indication on a PDCCH at 812, and gNB2 can transmit a similar paging indication on PDCCH at 814. These indications may be transmitted similarly in time, and/or may be transmitted using similar parameters. In addition, the paging indications can include PO/PF calculation parameters (e.g. IMSI, DRX cycle), scrambling parameters and MCS. At the same PO/PF, each gNB can schedule the paging transmission. The paging message is sent by each gNB and/or corresponding cell using same MCS, same scrambling, and/or same content at the same time (e.g., at 816 and 818).

Figure 9:
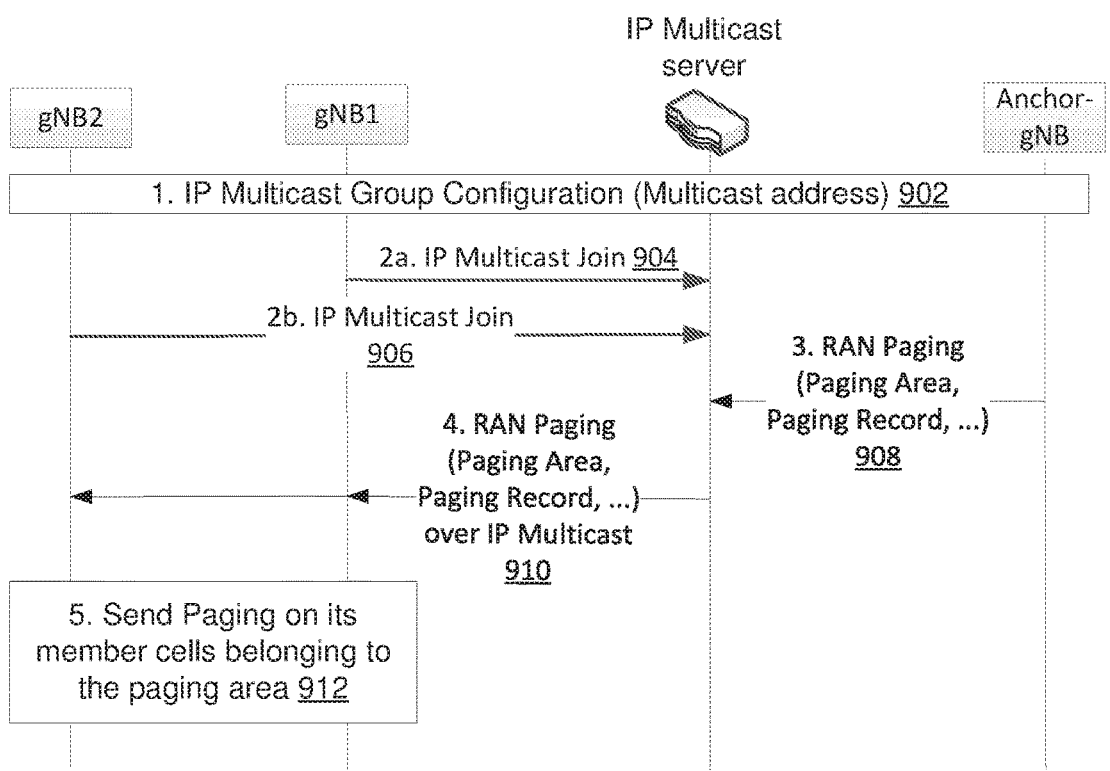
FIG. 9 is a block diagram illustrating an example of a system for radio access network (RAN)-based multicasting paging, in accordance with various aspects of the present disclosure.

FIG. 9 illustrates an example of a wireless communication system 900 including gNBs, an IP multicast server, and an anchor gNB to illustrate RAN-based multicast paging. Unlike CN paging, RAN paging may not have a fixed originator. Theoretically, any gNB/eNB can act as anchor and initiate paging. The RAN notification/paging area can theoretically be UE specific. The IP multicast area can be semi-static. Otherwise, the dynamic multicast group establishment cost may downgrade the benefit of multicast. Each IP multicast group can have an IP multicast server. Physically, the multicast server may be implemented/co-located with any gNB/eNB. If the multicast server is co-located with anchor gNB, the multicast mechanism can be similar to CN paging. Otherwise, anchor gNB can send the paging to multicast server for multicast server to multicast the RAN paging message to other gNBs/eNBs.

For example, in system 900, IP multicast group may be configured either during X2/Xn setup or by OAM at 902. Each member gNB/eNB can receive an IP multicast address during the group configuration/management. Each gNB/eNB can join the IP multicast group by sending IP multicast join message toward the IP multicast address. Thus, for example, gNB1 can transmit an IP multicast join at 904, and gNB2 can transmit an IP multicast join at 906. When anchor gNB/eNB initiates a RAN paging, it can send the paging message to IP multicast server. The message includes paging area, paging record and/or other parameters, e.g. PO/PF parameters, MCS, scrambling parameters if coordinated paging broadcast would be used, etc. The paging area may be either a cell list, a paging area ID, or a paging area ID list. IP multicast server multicasts the RAN paging message to each gNB/eNB of the multicast group. For example, the anchor gNB can transmit a RAN paging message, which may include a paging area, paging record, etc., to the IP multicast server at 908. The IP multicast server can multicast the RAN paging message to the gNB1 and gNB2 at 910. gNB/eNB receives the RAN paging and can broadcast the paging message on its member cells belong to the paging area. Thus, gNB1 and gNB2 can send the paging message to member cells belonging to the paging area at 912. If none of its cells belong to the paging area, the gNB/eNB can ignore the RAN paging message. If the RAN notification/paging area includes gNBs/eNBs outside of the IP multicast group, the anchor gNB/eNB can send paging message to these gNBs/eNBs by unicast.

The RAN paging broadcast in air interface can be similar to CN paging broadcast. One difference can be that gNB/eNB receives broadcast parameters from anchor gNB/eNB instead of CN.

As described, for example, with coordinated paging broadcast, the UE received SNR for paging may be significantly improved. This can enable paging message to carry more parameters. When UE battery level is low, the UE may desire to selectively ignore some paging. However, current paging message may not have sufficient information for UE to selectively reject/ignore paging. To enable selective ignoring, the UE may know which service triggered the paging. The service information may be delivered to UE in paging in terms of one or more of a Flow identifier (ID), Slice ID, Bearer ID, e.g. dedicated radio bearer (DRB) ID, evolved packet system (EPS) bearer ID, Application ID, Application category, etc., as described.

In addition, for delay tolerant applications, the UE may decide to defer the responding to the paging based on the one or more parameters in the paging message. In addition to the new parameters above, the paging message may include delay tolerant indication. In current 2G/3G/4G system, UE may respond to paging, except for the modification type paging, e.g. SIB change. With above new parameters, UE may be allowed to ignore the paging. The paging originator (CN or anchor eNB/gNB) can have information on whether the paging response is expected, to avoid unnecessary actions e.g. repaging, NG2/S1 release, exception reporting, un-reachable flag setting, etc. It may be possible to use the augmented paging in the scenario where coordinated paging broadcasted is not available.

Figure 10:
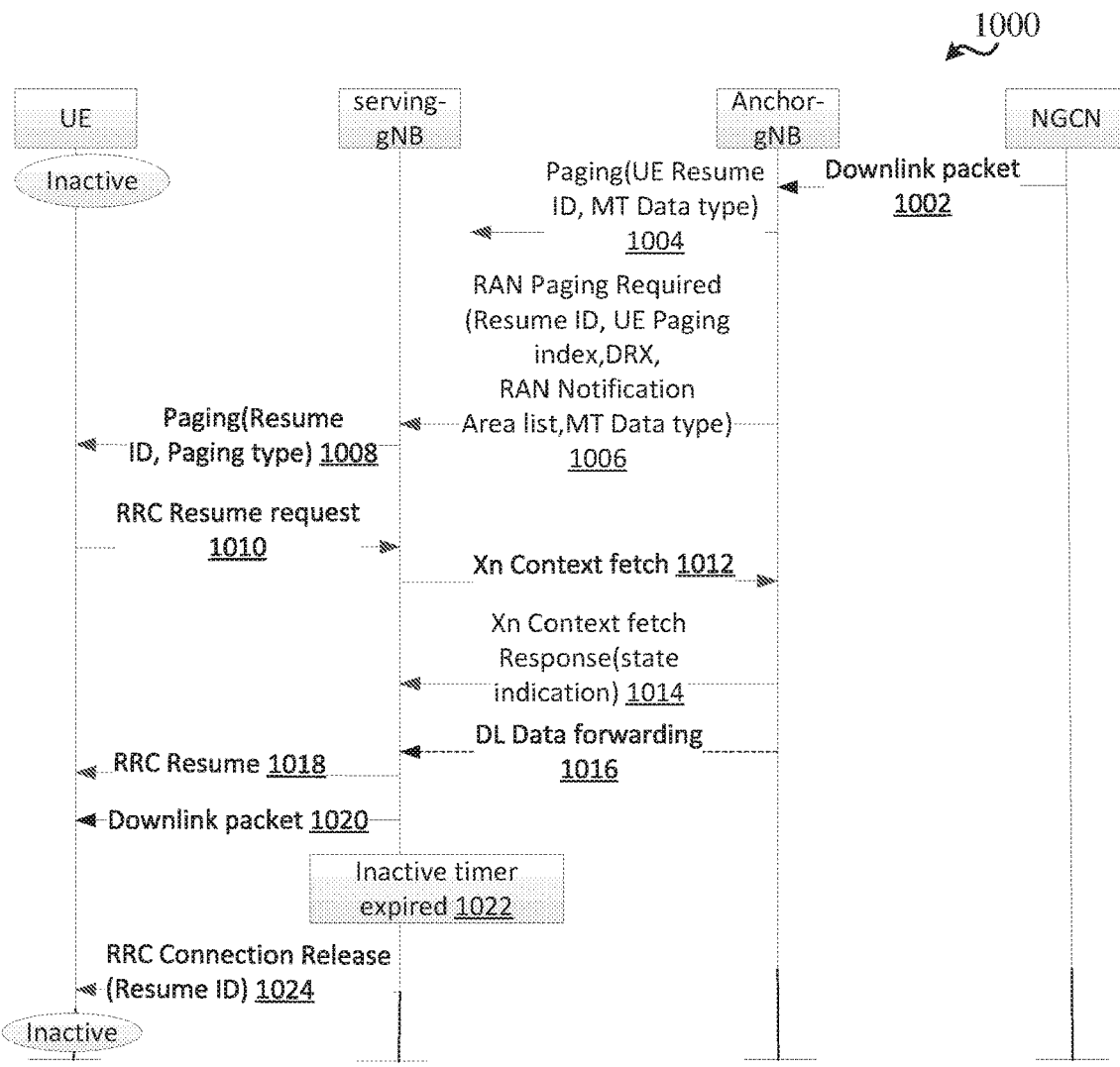
FIG. 10 is a block diagram illustrating an example of a system for paging with small downlink data, in accordance with various aspects of the present disclosure.
Figure 10:
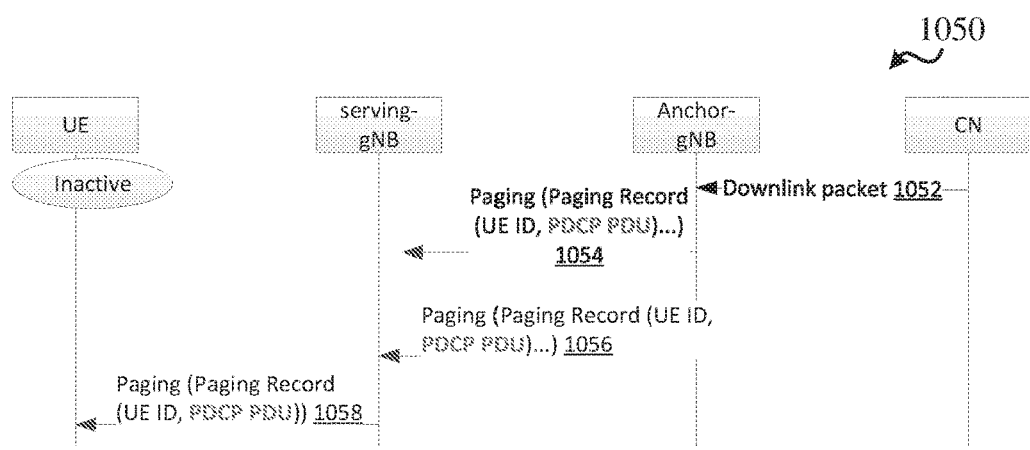

FIG. 10 illustrates examples of a wireless communication systems 1000, 1050 including a UE, gNBs, and a CN to illustrate RAN paging including small DL data in the paging message. Typically, as illustrated in system 1000, when downlink small data arrives and UE in inactive state, the network first brings the UE to RRC_CONNECTED state by RAN paging. Thus, for example, the next generation (NG) CN (NGCN) can transmit a downlink packet to the anchor gNB at 1002, and the anchor gNB can transmit a corresponding paging message at 1004, which may include a UE resume ID, data type, etc., and/or a paging required message to the serving eNB at 1006, which may include the UE resume ID, UE paging index, DRX indication, RAN notification, paging area list, data type, etc. This may cause the serving gNB to transmit a similar paging message at 1008. The UE can accordingly transmit a RRC request to the serving gNB at 1010 based on the paging message to switch to an RRC connected mode. While switching to the RRC connected mode, the serving gNB can send a context fetch request to the anchor gNB at 1012, and may receive the requested context for the UE at 1014. The anchor gNB may also forward DL data to the serving gNB at 1016, which can include the downlink packet received at 1002. The serving gNB can switch the UE to RRC connected mode to resume an RRC connection at 1018, and may forward the downlink packet at 1020. After expiration of an inactive timer at 1022, the serving gNB can switch the UE back to an RRC inactive mode by transmitting an RRC connection release at 1024.

In some cases, e.g., in the case of downlink small data transmission, this may not be efficient because it requires RRC signaling for Connection setup and release which leads to high signaling overhead and power consumption. With coordinated broadcast of paging messages, however, it can be possible to include more information in paging message. Thus, in an example, the paging message may include PDCP PDU of DL small data into paging record. The paging message may further indicate UE whether to respond to the paging. To support such kind of data transition in RRC_INACTIVE, the UE can refrain from re-establish its PDCP when entering into RRC_INACTIVE. An example is shown in system 1050. In this example, based on arrival of the downlink packet at 1052, the anchor gNB can broadcast a paging signal with the paging record, UE ID, and a PDCP PDU, within which the DL data may be encapsulated. The anchor gNB may also transmit the paging signal information to the serving gNB at 1056, including the paging record, UE ID and/or PDCP PDU, and the serving gNB can also accordingly broadcast the paging signal at 1058. Thus, the UE can receive the paging signals with the DL data in the PDCP PDU, and may not need to switch to the RRC connected state to obtain the data. If the data size is very small or the cell coverage is very good, it is also possible to apply above mechanism without coordinated broadcast.

Additionally, in LTE, physical downlink control channel (PDCCH) schedules paging transmission with P-RNTI (Paging RNTI). To avoid increasing the load of paging, it may be possible to use a RNTI different from paging RNTI for DL small data transmission. In this way, the message name may no longer be associated with "Paging," but, in backhaul, the corresponding parameters (e.g. PO/PF/DRX, scrambling, MCS) can still be delivered to gNBs/eNBs. The new RNTI may be (a) reserved for the system, (b) common for all the UEs in the RAN notification area, (c) common for all the UEs in a cell, (d) common for a group of UEs, etc. For options (b) and (d), the RNTI can be sent to UE by RRC signaling during RRC connection suspending or RRC Connection Reconfiguration. For option (c), the RNTI may be delivered to UE either by system information or RRC signaling. The DRX pattern for the new RNTI could be either same as paging or different from paging. If different from paging DRX (PO/PF), RAN can tell UE the DRX pattern by either dedicated RRC signaling or system information.

PWS/ETWS is defined in LTE. It is also possible to use broadcast/multicast to enhance the performance of PWS/ETWS. For example, IP multicast can be used for message transmission from CBC to gNBs. Coordinated PWS/ETWS broadcast in air interface can occur. In this case, the RNTI may be SI-RNTI (system information RNTI) or any other RNTI.

Figure 11:
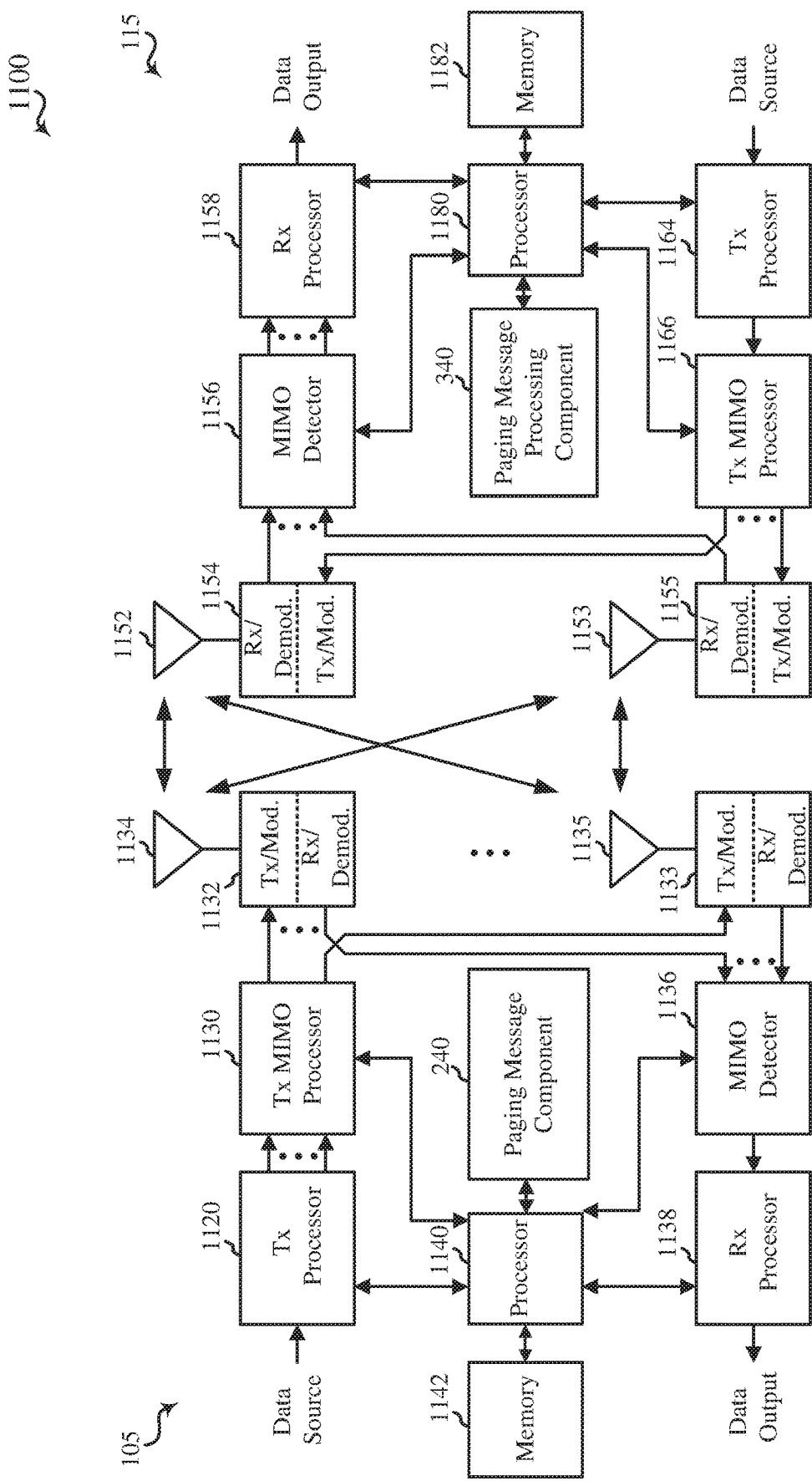
FIG. 11 is a block diagram illustrating an example of a MIMO communication system including a base station and a UE, in accordance with various aspects of the present disclosure.

FIG. 11 is a block diagram of a MIMO communication system 1100 including a base station 105 and a UE 115. The MIMO communication system 1100 may illustrate aspects of the wireless communication system 100 described with reference to FIG. 1. The base station 105 may be an example of aspects of the base station 105 described with reference to FIGS. 1-4. The base station 105 may be equipped with antennas 1134 and 1135, and the UE 115 may be equipped with antennas 1152 and 1153. In the MIMO communication system 1100, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 1120 may receive data from a data source. The transmit processor 1120 may process the data. The transmit processor 1120 may also generate control symbols or reference symbols. A transmit MIMO processor 1130 may perform spatial processing (e.g., precoding) on data symbols, control symbols, or reference symbols, if applicable, and may provide output symbol streams to the transmit modulator/demodulators 1132 and 1133. Each modulator/demodulator 1132 through 1133 may process a respective output symbol stream (e.g., for OFDM, etc.) to obtain an output sample stream. Each modulator/demodulator 1132 through 1133 may further process (e.g., convert to analog, amplify, filter, and upconvert) the output sample stream to obtain a DL signal. In one example, DL signals from modulator/demodulators 1132 and 1133 may be transmitted via the antennas 1134 and 1135, respectively.

The UE 115 may be an example of aspects of the UEs 115 described with reference to FIGS. 1-4. At the UE 115, the UE antennas 1152 and 1153 may receive the DL signals from the base station 105 and may provide the received signals to the modulator/demodulators 1154 and 1155, respectively. Each modulator/demodulator 1154 through 1155 may condition (e.g., filter, amplify, downconvert, and digitize) a respective received signal to obtain input samples. Each modulator/demodulator 1154 through 1155 may further process the input samples (e.g., for OFDM, etc.) to obtain received symbols. A MIMO detector 1156 may obtain received symbols from the modulator/demodulators 1154 and 1155, perform MIMO detection on the received symbols, if applicable, and provide detected symbols. A receive (Rx) processor 1158 may process (e.g., demodulate, deinterleave, and decode) the detected symbols, providing decoded data for the UE 115 to a data output, and provide decoded control information to a processor 1180, or memory 1182.

The processor 1180 may in some cases execute stored instructions to instantiate a paging message processing component 340 (see e.g., FIGS. 1 and 3).

On the uplink (UL), at the UE 115, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the modulator/demodulators 1154 and 1155 (e.g., for SC-FDMA, etc.), and be transmitted to the base station 105 in accordance with the communication parameters received from the base station 105. At the base station 105, the UL signals from the UE 115 may be received by the antennas 1134 and 1135, processed by the modulator/demodulators 1132 and 1133, detected by a MIMO detector 1136 if applicable, and further processed by a receive processor 1138. The receive processor 1138 may provide decoded data to a data output and to the processor 1140 or memory 1142.

The processor 1140 may in some cases execute stored instructions to instantiate a paging message component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 1100. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 1100.

Figure 12:
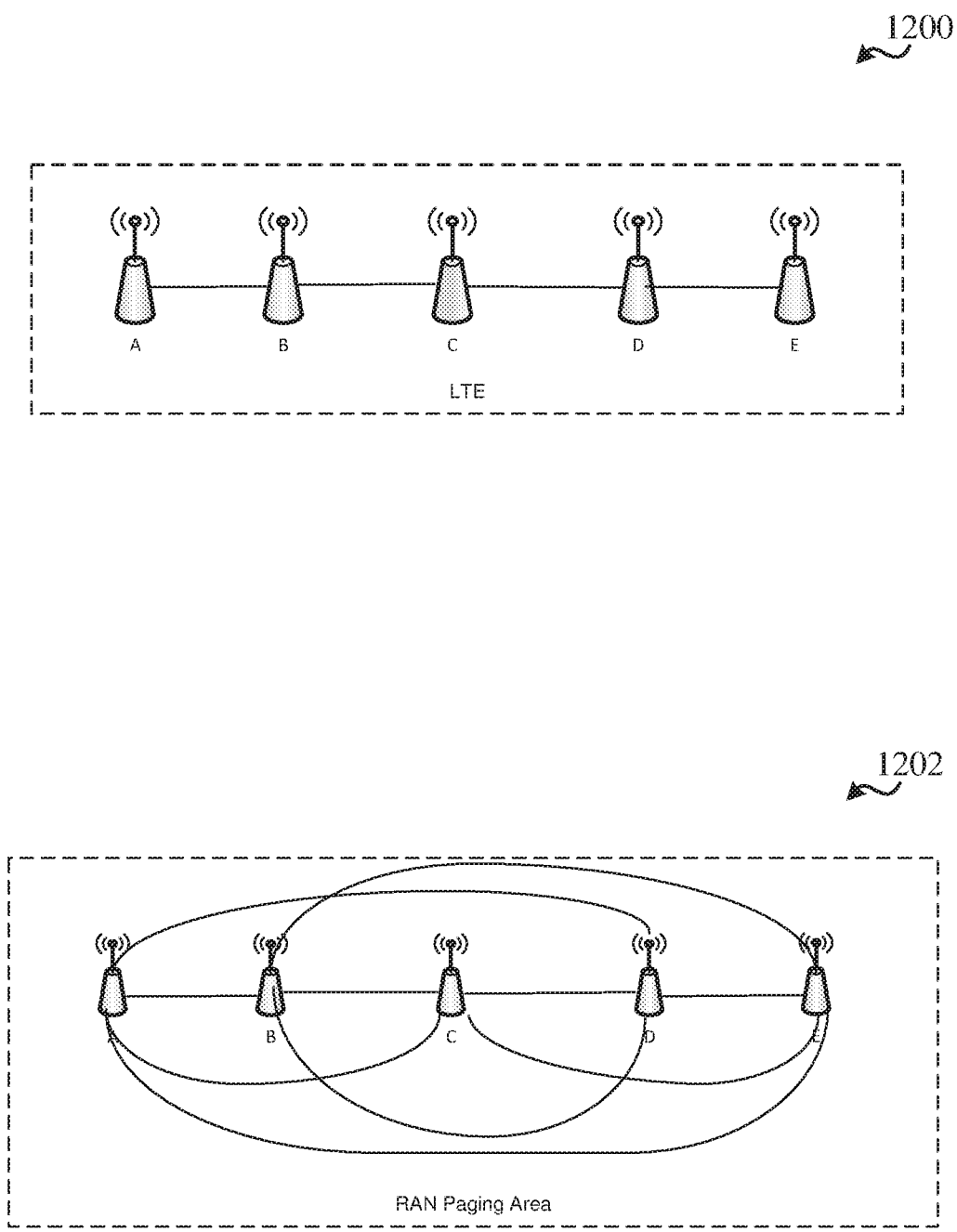
FIG. 12 is a block diagram illustrating an example of a system of geographical positions of base stations and logical connections, in accordance with various aspects of the present disclosure.

FIG. 12 illustrates examples of a wireless communication systems 1200, 1202 including geographical positions of eNBs/gNBs and logical connections of X2/Xn. In legacy LTE network, an eNB usually setups and maintains X2 with the eNBs which geographical close to it, as shown in systems 1200, 1202. In 5G, a new RAN controlled RRC state (RRC_INACTIVE, inactive state) can be defined, which can have a characteristic of low delay to start data transfer. In order to achieve this characteristic, in the inactive state, the connection (NG interface) between the NR RAN and NG-Core could be maintained to reduce signalling and corresponding setup delay. Given this, and the fact that the UE might move out of its initial serving 'cell,' with which the connection was maintained, a mechanism to notify the UEs can be used whenever there is downlink data buffered at the NR "anchor gNB" for the UE in inactive state. "Anchor gNB" refers to the gNB at which the connection between NR gNB and NG Core is maintained for the UE. However, the UE might have moved while being in inactive state, and therefore, anchor gNB can start RAN Paging in a RAN defined Notification/paging area. The same RAN Paging can be sent to all the RAN nodes in the RAN notification/paging Area simultaneously.

Figure 13:
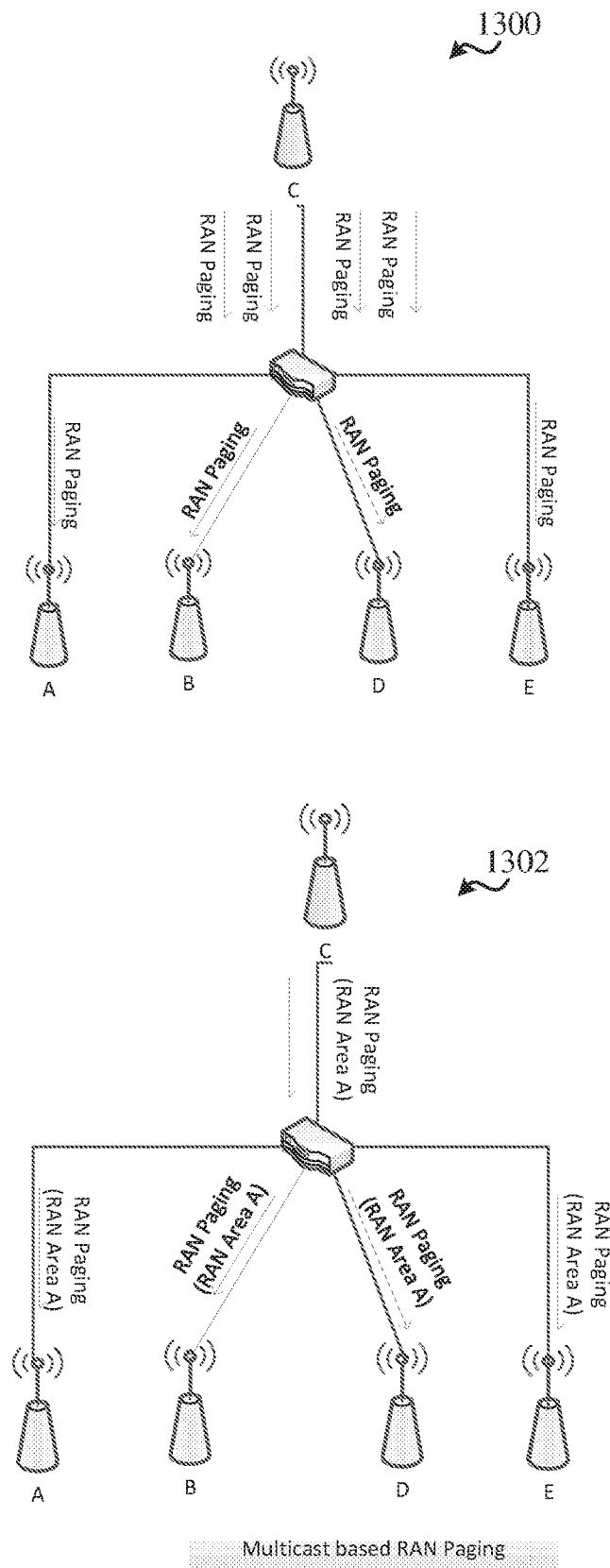
FIG. 13 is a block diagram illustrating an example of a system for RAN paging, in accordance with various aspects of the present disclosure.

FIG. 13 illustrates examples of a wireless communication systems 1300, 1302 including the RAN paging in this regard. With gNB C as the anchor gNB, if it pages an inactive UE, it can send the same paging message simultaneously to all the gNBs (A, B, D, E) within the RAN area, as shown in system 1300. Multicast RAN Paging can utilize a multicast server to receive the RAN Paging request from a single gNB and multicast it to all the registered gNBs (A, B, D, E) within the RAN paging Area. Each anchor gNB can be paging message initiator, the other RAN node within the RAN paging area can be a paging message receiver, as shown in system 1302.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for receiving paging messages in wireless communications, comprising:
    receiving, by a user equipment (UE), one or more parameters for descrambling non-cell specific paging messages;
    receiving, by the UE from one or multiple base stations, a non-cell specific paging message;
    descrambling, by the UE, the non-cell specific paging message based at least in part on the one or more parameters; and
    determining, by the UE, to refrain from responding to the descrambled non-cell specific paging message based at least in part on one or more service information parameters in the descrambled non-cell specific paging message.

2. The method of claim 1, wherein the one or more parameters are related to a virtual cell ID common for base stations in a paging broadcast area.

3. The method of claim 1, wherein a cyclic prefix length of the non-cell specific paging message is the same or different from a unicast message.

4. The method of claim 1, wherein the one or more service information parameters comprise at least one of a flow identifier, a slice identifier, a dedicated radio bearer identifier, an evolved packet system identifier, an application identifier, or an application type.

5. The method of claim 1, wherein the one or more service information parameters indicate whether a service or access type is delay tolerant, and wherein determining to refrain from responding to the descrambled non-cell specific paging message comprises determining to defer responding to the descrambled non-cell specific paging message where the service or access type is delay tolerant.

6. The method of claim 1, further comprising decoding downlink data from a packet data convergence protocol (PDCP) protocol data unit (PDU) in the descrambled non-cell specific paging message, wherein the UE is in an inactive state with the one or multiple base stations.

7. The method of claim 6, wherein receiving the non-cell specific paging message is based at least in part on a radio network temporary identifier (RNTI) indicated for paging messages with downlink data.

8. The method of claim 7, wherein a discontinuous receive (DRX) pattern for the paging messages with downlink data is different from a DRX pattern for paging messages without downlink data.

9. The method of claim 1, wherein the non-cell specific paging message is a public warning system or earthquake and tsunami warning system message.

10. An apparatus for receiving paging messages in wireless communications, comprising:
    a transceiver for communicating one or more wireless signals via one or more antennas;
    a memory configured to store instructions; and
    one or more processors communicatively coupled with the transceiver and the memory, wherein the one or more processors are configured to:
        receive one or more parameters for descrambling non-cell specific paging messages;

receive, from one or multiple base stations, a non-cell specific paging message;
descramble the non-cell specific paging message based at least in part on the one or more parameters; and
determine to refrain from responding to the descrambled non-cell specific paging message based at least in part on one or more service information parameters in the descrambled non-cell specific paging message.

11. The apparatus of claim 10, wherein the one or more parameters are related to a virtual cell ID common for base stations in a paging broadcast area.

12. The apparatus of claim 10, wherein a cyclic prefix length of the non-cell specific paging message is the same or different from a unicast message.

13. The apparatus of claim 10, wherein the one or more service information parameters comprise at least one of a flow identifier, a slice identifier, a dedicated radio bearer identifier, an evolved packet system identifier, an application identifier, or an application type.

14. The apparatus of claim 10, wherein the one or more service information parameters indicate whether a service or access type is delay tolerant, and wherein the one or more processors are configured to determine to refrain from responding to the descrambled non-cell specific paging message at least in part by deferring responding to the descrambled non-cell specific paging message where the service or access type is delay tolerant.

15. The apparatus of claim 10, further comprising wherein the one or more processors are further configured to decode downlink data from a packet data convergence protocol (PDCP) protocol data unit (PDU) in the descrambled non-cell specific paging message, wherein the apparatus is in an inactive state with the one or multiple base stations.

16. The apparatus of claim 15, wherein the one or more processors are configured to receive the non-cell specific paging message based at least in part on a radio network temporary identifier (RNTI) indicated for paging messages with downlink data.

17. The apparatus of claim 16, wherein a discontinuous receive (DRX) pattern for the paging messages with downlink data is different from a DRX pattern for paging messages without downlink data.

18. The apparatus of claim 10, wherein the non-cell specific paging message is a public warning system or earthquake and tsunami warning system message.

19. An apparatus for receiving paging messages in wireless communications, comprising:
means for receiving, one or more parameters for descrambling non-cell specific paging messages;
means for receiving, from one or multiple base stations, a non-cell specific paging message;
means for descrambling the non-cell specific paging message based at least in part on the one or more parameters; and
means for determining to refrain from responding to the descrambled non-cell specific paging message based at least in part on one or more service information parameters in the descrambled non-cell specific paging message.

20. The apparatus of claim 19, wherein the one or more parameters are related to a virtual cell ID common for base stations in a paging broadcast area.

21. The apparatus of claim 19, wherein a cyclic prefix length of the non-cell specific paging message is the same or different from a unicast message.

22. The apparatus of claim 19, wherein the one or more service information parameters comprise at least one of a flow identifier, a slice identifier, a dedicated radio bearer identifier, an evolved packet system identifier, an application identifier, or an application type.

23. The apparatus of claim 19, wherein the one or more service information parameters indicate whether a service or access type is delay tolerant, and wherein the means for determining to refrain from responding to the descrambled non-cell specific paging message determines to defer responding to the descrambled non-cell specific paging message where the service or access type is delay tolerant.

24. The apparatus of claim 19, further comprising means for decoding downlink data from a packet data convergence protocol (PDCP) protocol data unit (PDU) in the descrambled non-cell specific paging message, wherein the apparatus is in an inactive state with the one or multiple base stations.

25. A non-transitory computer-readable medium, comprising code executable by one or more processors for receiving paging messages in wireless communications, the code comprising:
code for receiving, by a user equipment (UE), one or more parameters for descrambling non-cell specific paging messages;
code for receiving, by the UE, from one or multiple base stations, a non-cell specific paging message;
code for descrambling, by the UE, the non-cell specific paging message based at least in part on the one or more parameters; and
code for determining to refrain from responding to the descrambled non-cell specific paging message based at least in part on one or more service information parameters in the descrambled non-cell specific paging message.

26. The non-transitory computer-readable medium of claim 25, wherein the one or more parameters are related to a virtual cell ID common for base stations in a paging broadcast area.

27. The non-transitory computer-readable medium of claim 25, wherein a cyclic prefix length of the non-cell specific paging message is the same or different from a unicast message.

28. The non-transitory computer-readable medium of claim 25, wherein the one or more service information parameters comprise at least one of a flow identifier, a slice identifier, a dedicated radio bearer identifier, an evolved packet system identifier, an application identifier, or an application type.

29. The non-transitory computer-readable medium of claim 25, wherein the one or more service information parameters indicate whether a service or access type is delay tolerant, and wherein the code for determining to refrain from responding to the descrambled non-cell specific paging message determines to defer responding to the descrambled non-cell specific paging message where the service or access type is delay tolerant.

30. The non-transitory computer-readable medium of claim 25, further comprising code for decoding downlink data from a packet data convergence protocol (PDCP) protocol data unit (PDU) in the descrambled non-cell specific paging message, wherein the UE is in an inactive state with the one or multiple base stations.

* * * * *

UNITED STATES PATENT AND TRADEMARK OFFICE
CERTIFICATE OF CORRECTION

PATENT NO. : 11,343,794 B2
APPLICATION NO. : 16/465072
DATED : May 24, 2022
INVENTOR(S) : Huichun Liu et al.

Page 1 of 1

It is certified that error appears in the above-identified patent and that said Letters Patent is hereby corrected as shown below:

On the Title Page

(72) Inventors reads:
"Huichun Liu, Beijing (CN); Xipeng Zhu, Beijing (CN); Peng Cheng, Beijing (CN); Ruiming Zheng, Beijing (CN); Gavin Bernard Horn, San Diego, CA (US); Luis F.B. Lopes, Swindon (GB)"

Should read:
-- Huichun Liu, Beijing (CN); Xipeng Zhu, San Diego, CA (CN); Peng Cheng, Beijing (CN); Ruiming Zheng, Beijing (CN); Gavin Bernard Horn, San Diego, CA (US); Luis F.B. Lopes, Swindon (GB) --

Signed and Sealed this
Twelfth Day of July, 2022

Katherine Kelly Vidal
*Director of the United States Patent and Trademark Office*